Figure 1:
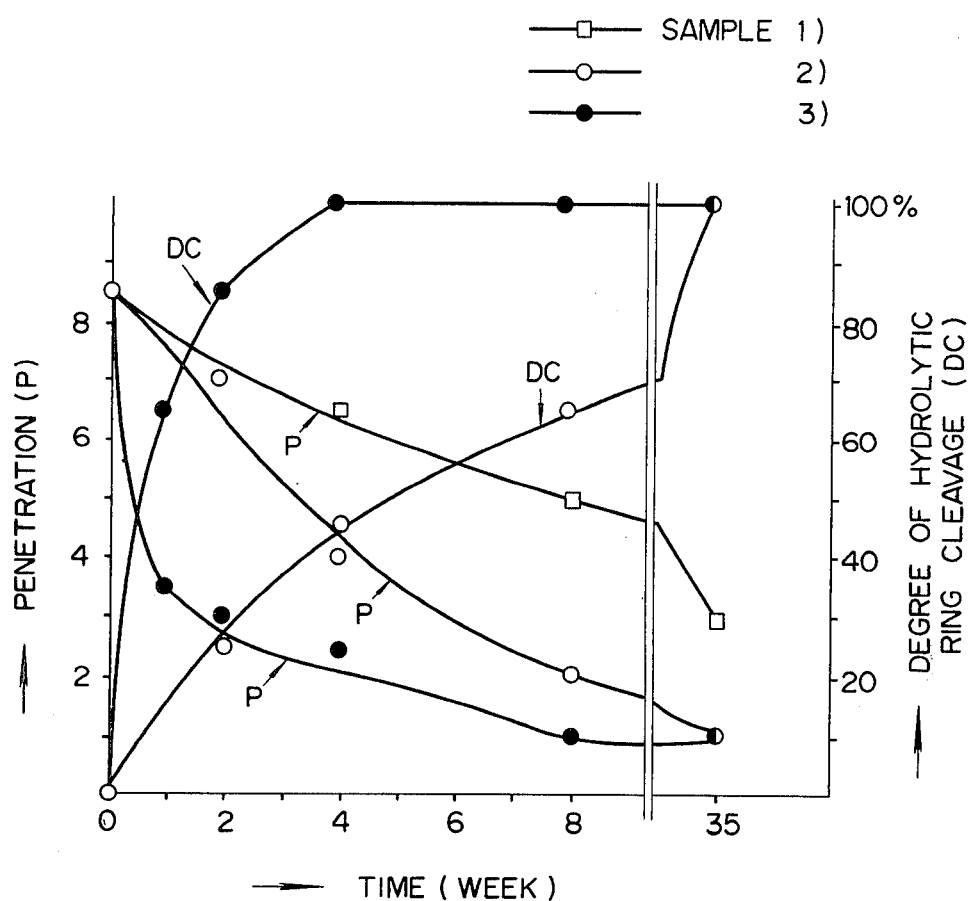

| United States Patent [19] | [11] | 4,071,581 |
| Yokoyama | [45] | Jan. 31, 1978 |

[54] PROCESS FOR PREPARING MODIFIED POLYOLEFIN WAXES

[75] Inventor: Nobuo Yokoyama, Yokohama, Japan

[73] Assignee: Nippon Oil Co., Ltd., Tokyo, Japan

[21] Appl. No.: 773,717

[22] Filed: Mar. 2, 1977

[30] Foreign Application Priority Data

Mar. 8, 1976  Japan ................................. 51-24078

[51] Int. Cl.$^2$ ..................... C08F 8/46; C08F 255/02
[52] U.S. Cl. ..................................... 260/878 R; 526/56; 526/272; 260/346; 260/74; 260/533 R
[58] Field of Search ............ 526/56, 272; 260/878 R, 260/346.8 R, 533 R

[56] References Cited

U.S. PATENT DOCUMENTS

| 3,480,580 | 11/1969 | Joyner et al. ........................... 526/56 |
| 3,642,722 | 2/1972 | Knowles et al. ........................ 526/56 |
| 3,892,717 | 7/1975 | Mori et al. .............................. 526/56 |
| 4,028,436 | 6/1977 | Bogan et al. ........................... 526/56 |

*Primary Examiner*—Alan Holler
*Attorney, Agent, or Firm*—Frank J. Jordan

[57] ABSTRACT

A process for the preparation of a modified polyolefin wax having improved hardness and gloss, which comprises reacting a waxy polyolefin with maleic anhydride to produce a maleinised polyolefin wax, reacting at 100° – 180° C the thus-produced maleinised wax with water in an amount of 2 – 80 parts by weight per 100 parts by weight of the maleic anhydride reacted with the waxy polyolefin and, if desired, distilling off from the reaction system an excess of the water remaining therein after the end of the hydrolytic reaction, at a temperature of 100° – 180° C under atmospheric or a reduced pressure.

4 Claims, 3 Drawing Figures

PROCESS FOR PREPARING MODIFIED POLYOLEFIN WAXES

This invention relates to an improved process for the preparation of a modified polyolefin wax. More particularly, it relates to a process for preparing a modified polyolefin wax having improved hardness and gloss which comprises reacting a waxy polyolefin having a molecular weight of 400 – 5,000 with maleic anhydride at a temperature of 120° – 300° C under atmospheric or higher pressure in the presence or absence of a catalyst or a reaction initiator to produce a maleinized or maleinated polyolefin wax, reacting the thus produced maleinized polyolefin wax with water in an amount of 2 – 80 parts by weight per 100 parts by weight of the maleic anhydride participated in said maleinizing reaction, at a temperature of 100° – 180° C under atmospheric or higher pressure and, if necessary, distilling an excess of water remaining in the reaction mixture at a temperature of 100° – 180° C under atmospheric or lower (reduced) pressure, thereby to prepare the modified polyolefin wax.

It is generally known that a wax having a molecular weight of 400 – 5,000 or more may be obtained by subjecting each of $C_2 - C_4$ olefins or mixtures thereof to a controlled polymerizing reaction or subjecting high polymers of each of $C_2 - C_4$ olefins or mixtures thereof to a controlled decomposing reaction and that a useful modified polyolefin wax may be obtained by reacting such wax with maleic anhydride thereby to provide the wax with polarity and reactivity (British Pat. No. 1,037,405 and Japanese Patent Gazette No. 41710/73). Processes for the preparation of such starting waxes and modified waxes thereof are described in detail in Japanese patent application No. 121000/74 (Japanese Patent Application Laying-Open Gazette No. 47095/76) and Japanese Patent Application No. 121001/74 (Japanese Patent Application Laying-Open Gazette No. 47094/76) previously filed by Nippon Oil Company.

The conventional modified waxes so obtained are now being studied in an attempt to make them dispersed or emulsified in water to obtain a dispersion or emulsion thereof or make them mixed with various oils to obtain a wax-oil blend, for use as a floor polishing emulsion, a polishing agent for automobiles and the like, a shoe polish, a sizing agent for fibers and paper, an ink, a coating composition or the like.

These conventional waxes are required to have specific properties depending upon their use and, in general, they are required to have satisfactory hardness, non-stickiness and surface appearance excellent in gloss, color and the like since they are used as a coating material in many cases. They may, in not a few cases, be required to be brittle and readily crushable to meet the necessity of working.

The polymers of each of $C_2 - C_4$ olefin or mixtures thereof have the aforesaid required properties to some extent but not to the full extent. In particular, the lower the molecular weight of the polymers is, the more remote the properties thereof are from the aforesaid required ones. Such polymers having a low molecular weight may be modified with maleic anhydride to somewhat improve them in various chemical properties due to the introduction of the polar group thereinto as well as in physical properties as mentioned above, but such improvements are not satisfactorily great.

Bearing the aforesaid various facts in mind, the present inventor made various studies on modified polyolefin waxes prepared by reacting waxy polyolefin with maleic anhydride, during which he made a very interesting discovery that although modified waxes obtained from waxy polyolefins having a comparatively low molecular weight are soft, somewhat sticky and insufficiently glossy soon after the synthesis thereof thereby rendering them unsuitable for many purposes for which they would otherwise be used, they will gradually grow hard and brittle and increase in gloss if they are allowed to stand for a long period of time.

Studies were made to clarify the reason for these changes of the modified wax and, as a result of the studies, it has been found that the cyclic acid anhydride groups contained in the modified waxes are gradually ring-cloven by hydrolysis in the presence of moisture in the atmosphere while they are attended by the aforesaid changes.

Said changes themselves are generally considered desirable; however, the usual modified waxes having a low molecular weight will vary in properties with the lapse of time due to their low moisture absorption rate whereby they do not have constant properties and they have different properties at the surface portion than at the inner portion since the changes proceed from the surface portion to the inner portion, this being considered to be the disadvantages of the usual modified waxes.

Water was tried to be particularly added to the reaction system at the last stage of producing a modified wax in an attempt to overcome such disadvantages and produce a modified wax having desired properties, with the result that there was obtained, as was expected, a modified wax originally having satisfactory hardness, brittleness, a glossy and smooth surface and a bright color.

Furthermore, relationships between the degree of ring cleavage of the acid anhydride groups contained in modified waxes by hydrolysis (such ring cleavage by hydrolysis being hereinafter referred to as "hydrolytic cleavage") and the properties of the modified waxes were investigated by varying the amount of water added to the reaction system at the last stage of production of the modified wax and, as a result of the investigation, it was found that when the degree of hydrolytic cleavage had attained to 0.1, desired properties began to be secured on the resulting modified wax and when the degree had attained to 0.5, the desired properties were generally secured on the resulting modified wax to a required extent.

It was also found that the acid anhydride groups having been subjected to ring cleavage by hydrolysis (such groups being hereinafter sometimes referred to as "hydrolyzed acid anhydride groups" or simply as "acid groups") are easily dehydrated for cyclization by, for example, heating under a reduced pressure and that if it is necessary to distill off an excess of the water remaining after the reaction then the distillation-off should be effected under such mild conditions that the cyclization is avoided. This invention has thus been accomplished.

This invention will be further detailed hereinbelow.

The waxy polyolefins used herein are those of each of $C_2 - C_4$ olefins or mixtures thereof and have a molecular weight of 400 – 5,000, preferably 500 – 3,000, more preferably 500 – 1,500.

The waxy polyolefins may be reacted with maleic anhydride at a relatively low temperature if the reaction is effected in the presence of a catalyst or a reaction initiator, although, in general, the reaction may readily proceed at 180° – 300° C even in the absence of the catalyst or the reaction initiator. In the latter case (where neither catalyst nor initiator is used), the reaction rate is low at not higher than 200° C and the reaction will tend to be attended with side reactions such as pyrolysis if it is effected at not lower than 300° C; thus, the preferable temperature range can be from 220° to 280° C. However, because of the boiling point of maleic anhydride being about 200° C, in order to carry out the reaction in a favorable manner, it is necessary to effect the reaction in a closed pressure-proof vessel, under the conditions that maleic anhydride is added in such excess to the reaction system as to remain in a sufficient amount for reaction even after a part of the maleic anhydride has been distilled off from the open system, during the maleination reaction, or in an open system equipped with a reflux condenser so the maleic anhydride distilled or sublimated out can be condensed and washed back with a suitable solvent of $C_8 - C_{12}$ hydrocarbons, such as xylene or n-octane added together into the system.

The reaction will end in 2 – 8 hours. Since, however, all of maleic anhydride added is generally not reacted, it is necessary to remove the unreacted maleic anhydride from the system by blowing nitrogen gas thereinto or distilling off the unreacted maleic anhydride after the duration of reaction for a desired period of time.

The modified waxes so obtained contain the acid anhydride groups the amount of which may be known by measuring the saponification value of the waxes. The saponification value of a sample is a numeral value in milligram indicating the amount of KOH reacted with one gram of the sample.

Representing a saponification value as a symbol P, the amount M in gram of maleic anhydride reacted with every one gram of a starting polyolefin is expressed by the following formula (1)

$$M = \frac{1.0}{\frac{1,143}{P} - 1.0} \quad (1)$$

The amount H (mg) of $H_2O$ required to hydrolytically break all the acid anhydride groups contained in one gram of the thus-obtained modified wax is expressed by the following formula (2)

$$H = P \times (18/56) \quad (2)$$

It is possible to anticipate the saponification value of the resulting modified wax with practically satisfactory accuracy so long as the modifying reaction is effected under known conditions without actually measuring the saponification value since a polyolefin and maleic anhydride are reproducibly reacted with each other if the reaction conditions are carefully controlled.

The cyclic acid anhydride groups contained in a modified wax as a result of addition reaction may readily be subjected to ring cleavage by adding to the modified wax water in such a necessary amount as to break said acid anhydride groups. The degree of ring cleavage (the ratio between the number of hydrolytically cloven acid anhydride groups and that of non-cloven ones) may vary from 0.1 to 1.0 depending upon the purpose for which the acid anhydride group-containing wax is used. However, it is not particularly necessary to select a ring cleavage ratio of higher than 0.5 since no further changes are not clearly appreciated in the modified wax having a ring cleavage ratio of more than 0.5. If operationally necessary, water may be added in an excessive amount to the reaction system for hydrolysis and the excess of water remaining at the end of the reaction may be distilled off from the system under suitable conditions; in this case a ring cleavage ratio of 1.0 may be attained.

In order to react the modified wax with water added, it is necessary to carry out the reaction at temperatures not lower than those at which the modified wax is in such a fluid state that it may be agitated; since, however, the use of excessively high temperatures for the reaction will allow the added water to be distilled off from the reaction system without its participation in the reaction, the reaction temperatures may preferably be in the range of 120° – 180° C at which the reaction may be effected in an open-type reactor at atmospheric pressure or may of course be effected in a closed-type pressure-proof vessel.

If an excessively large amount of water be added to the modified wax for ring cleavage, then it will be necessary to distil off from the reaction system the water remaining therein at the end of the reaction although such distillation-off is not necessary in cases where water is added in a desired amount predetermined by calculation. Since, however, the acid groups obtained by hydrolysis may be readily dehydrated under a reduced pressure into the original cyclic acid anhydride groups, the distillation-off should be limited to a necessary minimal extent and may therefore be generally effected at a temperature of 120° – 150° C and a reduced pressure of 10 – 100 mm Hg for 10 – 30 minutes.

The hydrolyzing reaction may successively be effected subsequent to the maleinizing reaction and the distillation-off of the unreacted maleic anhydride or may be effected on the modified (maleinized) wax not so successively but at any time desired.

The hydrolyzed modified wax so obtained, as compared with the original non-hydrolyzed one, exhibits satisfactory hardness, brittleness, surface gloss and light color thereby rendering it more suitable for use as wax in many applications.

COMPARATIVE EXAMPLE 1

A polyolefin wax which was an ethylene polymer, was reacted with maleic anhydride to obtain a modified or maleinized wax. The starting and modified waxes had the properties respectively shown in the following Table 1.

Table 1

|  | Starting wax | Modified wax |
|---|---|---|
| Average molecular, weight[1] | 633 | 675 |
| Hardness (Penetration degree)[2] | 13.5 | 8.5 |
| Melting point[3] | 89° C | 89° C |
| Bromine value[4] | 13 | 9 |
| Saponification value[5] | 0 | 81 |

Notes:
[1] Measured by ebulliometry.
[2] Measured in accordance with ASTM D 1321-70
[3] Measured in accordance with ASTM D 127-63
[4] Measured in accordance with ASTM D 1158-59
[5] Measured in accordance with ASTM D 1387-59

More particularly, the said modified wax was obtained by charging 3.2 kg of the starting wax and 350 g of maleic anhydride in a 5-liter autoclave, heating the resulting mixture to 240° C in a nitrogen atmosphere, maintaining it under agitation at this temperature for an additional four hours and then distilling off the unreacted maleic anhydride from the reaction system at a temperature of 150° C and a reduced pressure of 10 - 20 mm Hg.

COMPARATIVE EXAMPLE 2

Samples of the modified wax obtained in Comparative example 1 were allowed to stand still under the following conditions, respectively:

Sample 1: in a dried desiccator at room temperature,
Sample 2: in atmosphere at a constant temperature of 30° C, and
Sampe 3: under a relative humidity of 100% at a constant temperature of 30° C in a vessel.

At certain intervals of time, each of these samples 1 - 3 was tested for penetration degree and a surface portion scraped off from each of the samples 1 - 3 also tested for infra-red absorption. The degrees or ratios of ing cleavage were calculated from the results obtained by the aforesaid tests.

FIG. 1 shows the relationships between the surface moisture absorption and hardness of the modified polyolefin wax in terms of the relationships between the penetration degree and hydrolytic cleavage thereof.

Figure 2:
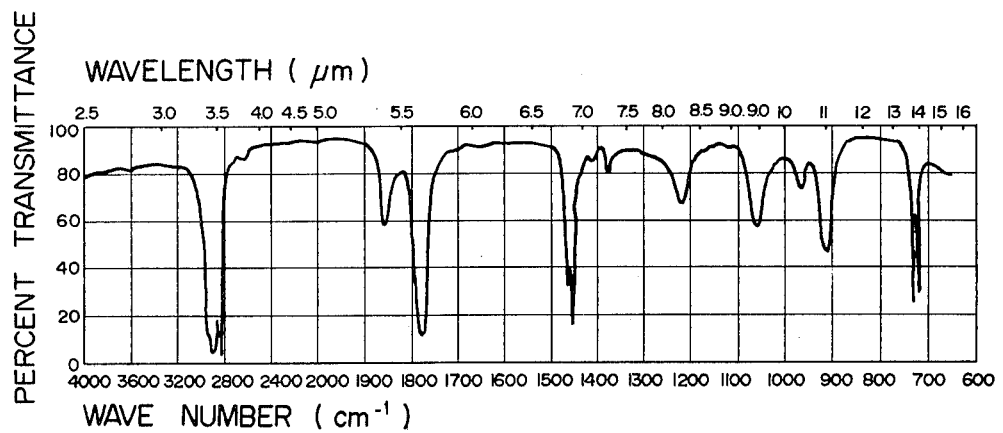
Figure 3:
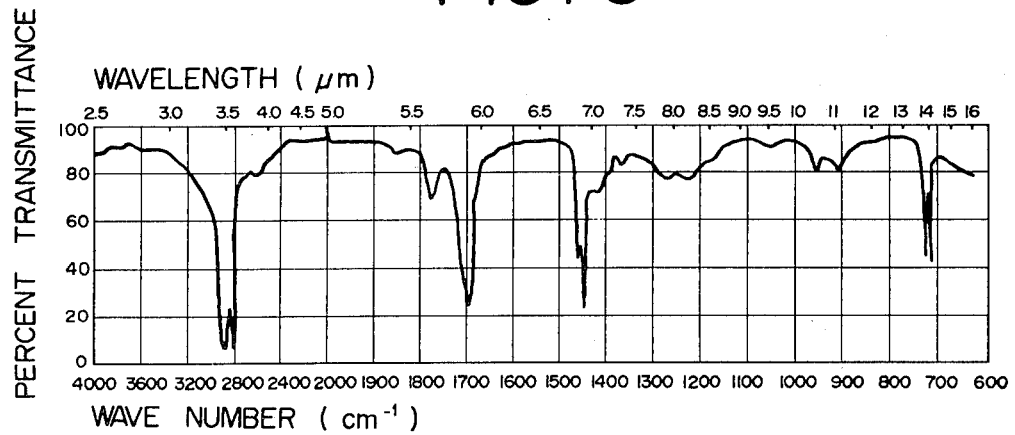

FIGS. 2 and 3 each show the infra-red spectrum of a maleic anhydride-modified polyethylene wax in which the greater part of the acid anhydride groups have been hydrated.

In addition, in FIG. 1, a graph indicating the hydroytic cleavage rate for Sample 1 is omitted since the rate was zero through the test period. In FIG. 2, a pair of absorptions respectively at 1790 cm$^{-1}$ and 1869 cm$^{-1}$ are due to the presence of the cyclic acid anhydride groups and in FIG. 3, an absorption at 1710 cm$^{-1}$ is due to the presence of the acid groups obtained by hydrolysis.

As is apparent from FIG. 1, the modified waxes Samplese 2 and 3) in a moist atmospheres always absorbed the moisture progressively on the surface layer at different absorption rates depending upon the moisure of the atmosphere and became harder with the progress of the absorption. Sample 1 placed under the dry or non-moistened circumstances was also gradually hardened. From the foregoing it has been found that the cause for the hardening is the absorption of moisture but is not limited to this.

Furthermore, the samples once moistened were placed in a dry atmosphere at room temperature for 30 weeks but they did not exhibit the dehydration thereof. This indicates that the waxes having the hydrolytically cloven acid anhydride groups were satisfactorily stable at room temperature and they exhibited no changes in properties with the lapse of time.

EXAMPLE 1

Two hundred grams of a modified wax prepared in the same manner as in Comparative example 1 were introduced into a flask, melted by heating to 120° C and incorporated dropwise with 8 g of water under agitation over a time period of 30 minutes. The amount of the water was three times as large as the acid anhydride groups the amount of which was determined by calculation from the saponification value of the modified wax. Soon after the addition of the water, the resulting reaction mixture was pumped to 30 mmHg at 120° C to distil off the excess of the water therefrom thereby obtaining a hydrolyzed modified wax. The distillation-off was completed in 10 minutes.

The modified wax so hydrolyzed exhibited a penetration of 1.5, satisfactory gloss at the surface and generally lighter color than the original or starting modified wax.

The original modified wax and its hydrolyzed product were scraped with a metal file, a grater, and the like. The hydrolyzed product gave out fine powder smoothly, while the original modified wax partly sticked on to the metal surface and partly gave out particles of unhomogeneous sizes formed by clogging and sticking of the originally scraped out fine powder. This indicates that the hydrolysis as shown in this example, increased the brittleness of the original modified wax, thereby improving such processability as crushability.

EXAMPLE 2

Two hundred grams of a modified wax prepared in the same manner as in Comparative example 1 were charged in a flask, melted by heating to 120° C and then incorporated dropwise with 1.5 g of water under agitation over a time period of 10 minutes. The amount of 1.5 g of water corresponded with 50% of the acid anhydride equivalents of the starting modified wax. The resulting reaction mixture was agitated for 15 minutes and 20 g thereof were sampled for analysis (Sample 1); the remainder of the reaction mixture was further incorporated with 1.4 g of water and the reaction ended in 15 minutes (Sample 2). The amount of 1.4 g of water corresponded with that necessary for just hydrating all the acid anhydride groups of the remainder.

The product obtained by the two-step reaction was analyzed as shown in the following Table 2.

Table 2

| | Penetration degree | Ratio of hydrolytic cleavage of acid anhydride groups (Infra-red) | Effective reaction ratio of water added |
|---|---|---|---|
| Starting modified wax Sample 1 | 8.5 | 0 | |
| Water added in amount corresponding to 50% of equivalent of acid anhydride groups Sample 2 | 4.0 | 30% | 60% |
| Water added in amount corresponding to 100% of equivalent of acid anhydride groups | 3.0 | 45% | 45% |

From the results shown in Table 2, it has been found that even the partial hydrolytic cleavage of the acid anhydride groups will result in the production of a product wax having remarkably increased hardness, that such simple reaction methods as used herein will give a comparatively low reaction efficiency since part of water added is distilled off from the reaction system during the reaction and that refluxing or a closed pressure-proof reaction vessel will be needed if the reaction be necessary to effect at a higher reaction efficiency.

COMPARATIVE EXAMPLE 3

Substantially the same reaction as in Example 1 was carried out to form a reaction mixture which was then subjected to distillation at a temperature of 120° C and a reduced pressure of 5 mmHg for 1 hour thereby to obtain a product wax. A part of the product wax so obtained was sampled and measured for infra-red absorption whereby about 30% of the acid anhydride groups was found to have been cloven by hydrolysis.

The distillation was further continued at 150° C and 5 mmHg for one hour thereby to yield a product wax which was found to have cyclic acid anhydride groups only.

This clearly indicates that the acid anhydride groups once hydrolytically cloven may be easily dehydrated and cyclized under the same conditions as above. Therefore, if the hydration reaction is effected in the presence of an excessive amount of water, the unreacted water left subsequent to the end of the reaction should be distilled off from the reaction system under as mild conditions as minimally required.

EXAMPLE 3

A waxy copolymer of ethylene and propylene (propylene content 10 mol%) was processed in the same manner as in Example 1. In general, such copolymer shows similar properties and reactivity to those of the ethylene homopolymer, but the former is more soft and sticky than the latter, and hence is regarded inferior as the material for the surface coating purposes.

When processed in the same manner as shown in Example 1, however, the resulting modified product proved to be as hard, glossy, and brittle enough as that from the ethylene homopolymer wax, as summarized in Table 3.

Table 3

|  | Molecular weight | Saponification value | Penetration degree | Surface gloss | Feeling on fingers |
|---|---|---|---|---|---|
| Sample A | 720 | 0 | 18.0 | None | Sticky |

Table 3-continued

|  | Molecular weight | Saponification value | Penetration degree | Surface gloss | Feeling on fingers |
|---|---|---|---|---|---|
| ($C_2$-$C_3$ Copolymer ($C_3$: 10%)) Sample B (Maleinated product of A) | 810 | 94 | 12.0 | Slight | Sticky |
| Sample C (Hydrolyzed product of B. Hydrolytic cleavage of the acid anhydride groups: 100%) | 830 | 96 | 2.0 | Good enough | Brittle |

What is claimed is:

1. A process for preparing a modified polyolefin wax having improved hardness and gloss, comprising reacting a waxy polyolefin having a molecular weight of 400 – 5,000 with maleic anhydride at a temperature of 120° –300° C to obtain a maleinised wax and then reacting the thus-obtained maleinised wax with water in an amount of 2 – 80 parts by weight per 100 parts by weight of the maleic anhydride reacted with the waxy polyolefin, at a temperature of 100° – 180° C.

2. A process according to claim 1, further comprising distilling off from the reaction system an excess of the water remaining therein after the end of the hydrolytic reaction, at a temperature of 100° – 180° C under not higher than atmospheric pressure.

3. A process according to claim 1, wherein the maleinised polyolefin wax is reacted with water to an extent that a degree of hydrolytic cleavage of the acid anhydride groups of at least 0.1 is attained.

4. A process according to claim 2, wherein the maleinised polyolefin wax is reacted with water to an extent that a degree of hydrolytic cleavage of the acid anhydride groups of at least 0.1 is attained.

* * * * *